(12) United States Patent
Rozenman et al.

(10) Patent No.: US 7,577,681 B1
(45) Date of Patent: Aug. 18, 2009

(54) METHODS AND APPARATUS FOR MANAGING CONTENTS OF A DATABASE

(75) Inventors: Vitaly Rozenman, Shrewsbury, MA (US); Rajesh K. Gandhi, Shrewsbury, MA (US); Benjamin Bushoy, Needham, MA (US); Venkata R. Tiruveedi, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 493 days.

(21) Appl. No.: 11/169,458

(22) Filed: Jun. 29, 2005

(51) Int. Cl.
*G06F 17/30* (2006.01)
(52) U.S. Cl. .................... 707/103 R; 707/101
(58) Field of Classification Search ............ 707/103 R, 707/201, 2, 102, 101; 715/853; 719/316; 395/683
See application file for complete search history.

(56) References Cited

U.S. PATENT DOCUMENTS

| | | | | |
|---|---|---|---|---|
| 5,491,822 A | * | 2/1996 | Allen et al. ............ | 719/316 |
| 5,937,409 A | * | 8/1999 | Wetherbee ............ | 707/103 R |
| 5,995,973 A | * | 11/1999 | Daudenarde ........... | 707/103 R |
| 6,968,340 B1 | * | 11/2005 | Knowles ............... | 707/102 |
| 7,111,020 B1 | * | 9/2006 | Gupta et al. ........... | 707/201 |
| 2003/0074371 A1 | * | 4/2003 | Park et al. ............. | 707/103 R |
| 2006/0085764 A1 | * | 4/2006 | Klementiev ........... | 715/853 |

* cited by examiner

*Primary Examiner*—Etienne P LeRoux
(74) *Attorney, Agent, or Firm*—Chapin IP Law, LLC; Barry W. Chapin, Esq.

(57) ABSTRACT

Techniques herein involve anticipating the application of a command to modify objects having associated object data stored in a relational database. Prior to receipt of an object modification command that causes a modification to a respective object and/or an object hierarchy, a computer process generates a set of operational instructions to carry out the object modification command. Generally, the computer process analyzes a structure for storing object data in a relational database to identify information in the relational database that will be impacted as a result of executing a corresponding object modification command. Based on analysis of the structure, the computer process generates the set of operational instructions. The execution of the set of operational instructions to carry out the command causes the respective object and/or object hierarchy to be modified as well as causes a corresponding modification to contents of a relational database storing respective object data.

24 Claims, 7 Drawing Sheets

METHODS AND APPARATUS FOR MANAGING CONTENTS OF A DATABASE

RELATED APPLICATIONS

This application is related to United States Patent Application entitled "METHODS AND APPARATUS FOR SYNCHRONIZING CONTENT," identified as U.S. patent application Ser. No. 11/169,464, filed on Jun. 29, 2005, now issued as U.S. Pat. No. 7,447,709, the entire teachings of which are incorporated herein by this reference.

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to an increased need for storage by integrating high capacity data storage systems, data communications devices (e.g., switches), and computer systems (e.g., host computers or servers) into networks called "storage networks" or "Storage Area Networks" (SANs.) In general, a storage area network is a collection of data storage systems that are networked together via a switching fabric to a number of host computer systems operating as servers. The host computers access data stored in the data storage systems on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One way of managing resources associated with the storage area network is to maintain so-called managed objects. In general, a managed object is a software entity that defines a corresponding hardware or software resource of the storage area network. The network administrator utilizes the managed objects to identify different resources associated with the storage area network.

A set of managed objects can form an object hierarchy. A "top level" object (e.g., an object at a highest tier) associated with the hierarchy represents a particular storage resource (e.g., storage system) in the storage area network. Objects in the hierarchy beneath the "top level" object represent hardware or software resources of the storage area network associated with the particular storage resource. Accordingly, a hierarchy of managed objects can define specific resources and corresponding sub-resources in the storage area network associated with a respective storage system.

A storage administrator typically configures the storage area network to include multiple storage systems by creating and maintaining multiple object hierarchies. As suggested above, each object hierarchy represents a unique storage system (e.g., portion of resources) associated with the storage area network. Certain resources can be shared among multiple storage systems. Thus, multiple object hierarchies associated with the storage area network can include the same managed object. Other resources of the storage area network can be exclusive to a particular one of the defined storage systems.

Typically, each managed object of the storage area network has associated object data. According to one conventional application, object data associated with respective managed objects is stored in a relational database. Upon instantiation, mapping metadata provides an indication how to populate managed objects with corresponding object data retrieved from the relational database.

SUMMARY

Conventional applications that support management of objects having respective object data stored in relational databases typically suffer from a number of deficiencies. For example, conventional techniques require population of local memory with a complete hierarchy of related objects and corresponding object data in order to define the storage system boundaries for specific operation. Modifying contents of the object model results in a need to modify contents of the respective relational database storing object data, as well as relationships associated with the object hierarchy so that the database and object hierarchy are consistent with respect to each other. For example, deletion of a managed object typically requires modification to contents of the relational database so that the relational database does not needlessly maintain information associated with the managed object being deleted. All objects that are "owned" by the deleted object should be deleted as well, and the references to any part of the information about the objects should be deleted. If an object hierarchy is substantial in size, it can require considerable time and resources to retrieve object data from the relational database to instantiate an entire object hierarchy in local memory. Thus, according to this type of conventional application, such memory and processor resources therefore cannot be used for other purposes.

Even if ample memory space is available for instantiating an entire object hierarchy and corresponding object data as discussed above, initiating changes to the object hierarchy and therefore changes to the relational database can require generation of a tremendous number of individual database commands (e.g., SQL commands). For example, in a conventional application, a user may initiate deletion of a "top level"

object in the object hierarchy stored in local memory. To carry out a delete command, the relational database must be modified to remove respective object data stored in respective tables as well as pointers amongst different tables in the relational database so that the relational database no longer maintains information associated with the top level object as well as corresponding references to object data used to instantiate lower level objects associated with the deleted top level object.

As an example, assume that a "top level" object in a respective object hierarchy includes references to 30,000 different instances of corresponding lower level objects, each of which also has respective object data stored in the relational database. Assume further that a user decides to delete the top level object. In such a case, deletion of the top level object in a hierarchy requires a modification to the relational database storing the respective object data for the top level object. In addition to modifying the contents of the relational database to remove information associated with the top level object, the relational database must be modified to delete references (and potentially stored object data) associated with the 30,000 corresponding lower level objects. Conventional applications initiate generation and execution of a single SQL command to modify a corresponding entry in the relational database for each object at run-time. Consequently, for this example, conventional applications would require the generation and execution of at least 30,000 SQL commands to delete or modify respective contents in the relational database associated with the lower level objects. Conventional applications therefore require a significant amount of time to complete updating a database.

Techniques discussed herein deviate with respect to conventional applications such as those discussed above as well as additional techniques known in the prior art. In particular, embodiments herein enable generation of a set of operational instructions (e.g., a "stored" procedure) to more efficiently initiate a modification to objects and corresponding content (e.g., object data) stored in a relational database.

More specifically, techniques herein involve anticipating the application of a command (e.g., a delete command) to modify objects having associated contents such as object data stored in a relational database. Prior to receipt of an object modification command, a computer process (e.g., an algorithm) herein generates a set of operational instructions to carry out a respective modification to the relational database. For example, a computer process herein receives an object type associated with objects in an object hierarchy to which the command can be applied at a later time. In one embodiment, the objects to which the command can be applied are "top level" managed objects in an object hierarchy associated with a storage area network.

The computer process analyzes metadata to identify a relationship between the object type and a corresponding structure for storing associated object data in a relational database for the object type. The metadata resides at a mapping layer between objects of an object environment and the relational database and thus enables retrieval of object data from the relational database to instantiate the objects. One purpose of identifying the above relationship (e.g., as identified by the mapping layer) is to identify what content in the relational database will be impacted as a result of applying a respective delete command to a specified object in the object model. Based on the identified relationship, the computer process generates a set of operational instructions (e.g., a "stored" procedure) to modify contents of the relational database for the received object type. Thereafter, the process herein stores the set of operational instructions in anticipation of later receiving a corresponding command applied to a specified instance of the object of that type in an object environment.

Upon later receipt of a command to modify a specified top level managed object, another computer application such as a server application herein applies or executes the stored set of operational instructions to modify contents of the relational database. The above mentioned pre-processing technique such as identifying and analyzing a structure for storing object data in the relational database and generating a set of appropriate operational instructions to carry out the command reduces processing time otherwise required to identify relationships between an object and respective object data, pointers, etc. stored in the relational database at run-time when a user actually issues a command to delete an object and corresponding contents of a relational database.

One application of the technique discussed above is an environment in which a user initiates deletion of a managed object corresponding to a resource in a respective storage area network. Consequently, in this type of application, the user can issue a command to a server having access to a corresponding relational database and initiate the set of operational instructions to carry out a respective modification command on behalf of the user.

In addition to the embodiments discussed above, other embodiments herein include a computerized device (e.g., a host computer, workstation, etc.) configured to support the aforementioned method/operations to generate a set of operational instructions to carry out an action with respect to an object or object hierarchy having respective object data stored in a relational database. In such embodiments, the computerized device or application generating the set of operational instructions includes a memory system, a processor (e.g., a processing device), a display, and an interconnect. The interconnect supports communications among the display, the processor, and the memory system. The memory system is encoded with an algorithm that, when executed on the processor, produces a process that generates the set of operational instructions as discussed.

Yet other embodiments disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to facilitate management of a relational database as explained herein. The computer program logic, when executed on at least one processor in a respective computing system, causes the processor to perform the operations (e.g., the methods, algorithm, technique) indicated herein. Such embodiments are typically provided as software, code, and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular configuration herein is directed to a computer program product that includes a computer readable medium having instructions stored thereon for facilitating management of a relational database. The instructions, when carried out by a processor of a respective computer device, cause the processor to perform the steps of: i) receiving an object type associated with one or more objects in an object-oriented programming environment; ii) analyzing metadata to identify a relationship between the object type and a corresponding structure for storing associated object data in a relational database; iii) based on the relationship, generating a set of operational instructions to modify contents of the relational database for the received object type; and iv) storing the set of operational instructions in anticipation of later receiving a corresponding command applied to a given object in the object-oriented environment of the received object type. Other embodiments of the present disclosure include software programs to perform any of the method embodiment steps and operations summarized above and disclosed in detail below.

As discussed, techniques herein are well suited for use in applications enabling application of commands to objects having respective object data stored in a relational database. However, it should be noted that embodiments herein are not limited to use in such applications.

It should be understood that the system herein can be embodied as a software program or as a software program operating in conjunction with corresponding hardware. Example embodiments of the present application may be implemented in conjunction with EMC's Control Center software application that provides graphical management functionality for storage area network resources and in computerized devices that operate the Control Center software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one configuration herein, a computer process herein anticipates the application of a later initiated command to modify objects having associated object data stored in a relational database. Prior to receipt of an object modification command that causes a modification to a respective object/object hierarchy and/or relational database such as during a design phase, a computer process generates a set of operational instructions (e.g., a stored procedure) to carry out a respective object modification command on information in a relational database associated with an object being modified. The command can also be used to initiate modification of an object or objects in a respective object hierarchy.

In general, to generate the set of operational instructions, the computer process analyzes a structure for storing information such as object data, pointers, etc. in a relational database to identify what information in the relational database will be impacted as a result of executing a corresponding object modification command on a particular type of object. For example, according to one embodiment, deletion of a specified object results in deletion of the specified object itself as well as potentially other related objects in an object hierarchy. Based on an analysis of the structure for storing content associated with the respective object or objects in the relational database, the computer process herein identifies what content in the relational database will be impacted and need to be modified as a result of executing the corresponding object modification command on a specified object. The computer process then generates a set of operational instructions to carry out such a command when so later initiated by a user.

To carry out a command on the specified object at run time (which occurs after a design phase when the stored procedure is generated), a user initiates execution of the set of operational instructions to modify the respective object and/or object hierarchy as well as modify contents of a relational database storing respective object data. In one embodiment, the set of operational instructions, when executed, generate appropriate SQL statements to modify the contents of the relational database depending on which managed object a command is applied. Consequently, based on the above techniques, a user may initiate deletion of an object (in an object environment) as well as corresponding information in a relational database by initiating execution of the set of operational instructions (e.g., a stored procedure).

Figure 1:
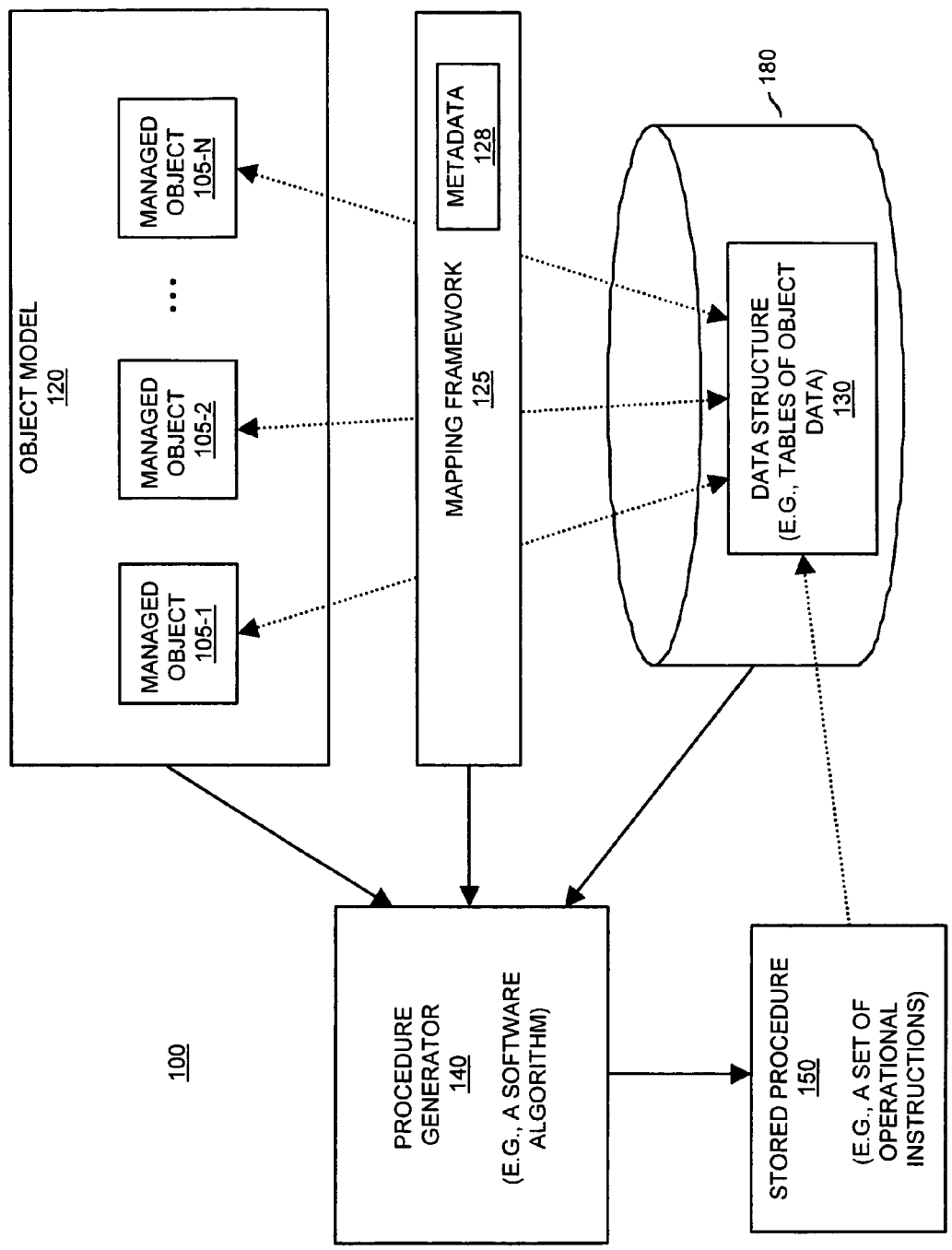
FIG. 1 is a diagram illustrating a technique of generating a set of operational instructions to carry out a command with respect to managed objects having associated object data stored in a relational database according to an embodiment herein.

FIG. 1 is a diagram illustrating an environment 100 in which procedure generator 140 generates stored procedure 150 for later modification of contents of relational database 180 and/or managed objects 105 in object model 120 according to an embodiment herein.

As shown, environment 100 includes object model 120. Object model 120 includes a representation of one or more possible object hierarchies including managed object 105-1, managed object 105-2, . . . , and managed object 105-N. Mapping framework 125 and, more specifically, metadata 128 provides a mapping between object model 120 and database 180 (e.g., a relational database) for populating managed objects 105 with data stored in data structure 130 of database 180. Based on input from mapping framework 125 and database 180, procedure generator 140 generates stored procedure 150 such as a set of operational instructions to execute a command with respect to a managed object 105 in object model 120 and corresponding information associated with the managed object 105 in database 180.

As previously discussed, techniques herein involve anticipating the application of a command (e.g., a delete command, a modify command, etc.) to a managed object 105 (or multiple managed objects) having associated contents such as object data stored in database 180. Prior to receipt of an object modification command to one or more of multiple managed objects 105 in object model 120 during a design phase, generator 140 (e.g., an algorithm) generates a set of operational instructions (e.g., stored procedure 150) to carry out a respective modification to contents of database 180. The stored procedure 150 can be executed at run-time to carry a command with respect to an object having corresponding content stored in database 180.

In one embodiment, managed objects 105 in object model 120 form one or more object hierarchies of managed objects associated with a storage area network. Contents of the object model 120 can be modified based on input such as a command from a user initiating deletion of a "top level" or "root" managed object in the object model 120. For example, one of multiple users (or other entities) can initiate deletion of a managed object 105 in object model 120. Depending on an association of the managed objects 105 with respect to each other, one or more managed objects 105 must be modified in response to receiving a delete command. Contents of database 180 must be modified as well because database 180 and, more specifically, data structure 130 includes information associated with the managed objects 105 being deleted.

Prior to generating stored procedure 150 for initiating a command to a corresponding managed object 105 in object model 120, procedure generator 140 is configured with an object type associated with a type of managed objects 105 in object model 120 to which the command can be applied at a later time (e.g., during run-time when the objects are used by a storage area network administrator that manages a respective system such as a storage area network). As mentioned, in one embodiment, the type of managed objects 105 to which the corresponding stored procedure 150 can be applied are "top level" managed objects 150 in a respective object hierarchy. However, embodiments herein can be extended to other types of managed objects such as those below a root of the object hierarchy with obvious modifications. Also, procedure generator 140 can generate a stored procedure 150 for a single managed object 105.

In furtherance of generating a stored procedure 150, procedure generator 140 analyzes metadata 128 (e.g., mapping information) to identify a relationship between a specified object type and a corresponding structure 130 for storing associated object data in relational database 180. As shown, the metadata 128 resides at a mapping layer between the object model 120 and the relational database 180. Use of the metadata 128 enables the procedure generator 140 to identify a relationship between the objects 105 in object model 120 and contents of database 180 associated with the objects. In one embodiment, mapping framework 125 can be implemented by a software application such as Toplink™ to support mapping between object model 120 and database 180.

Figure 2:
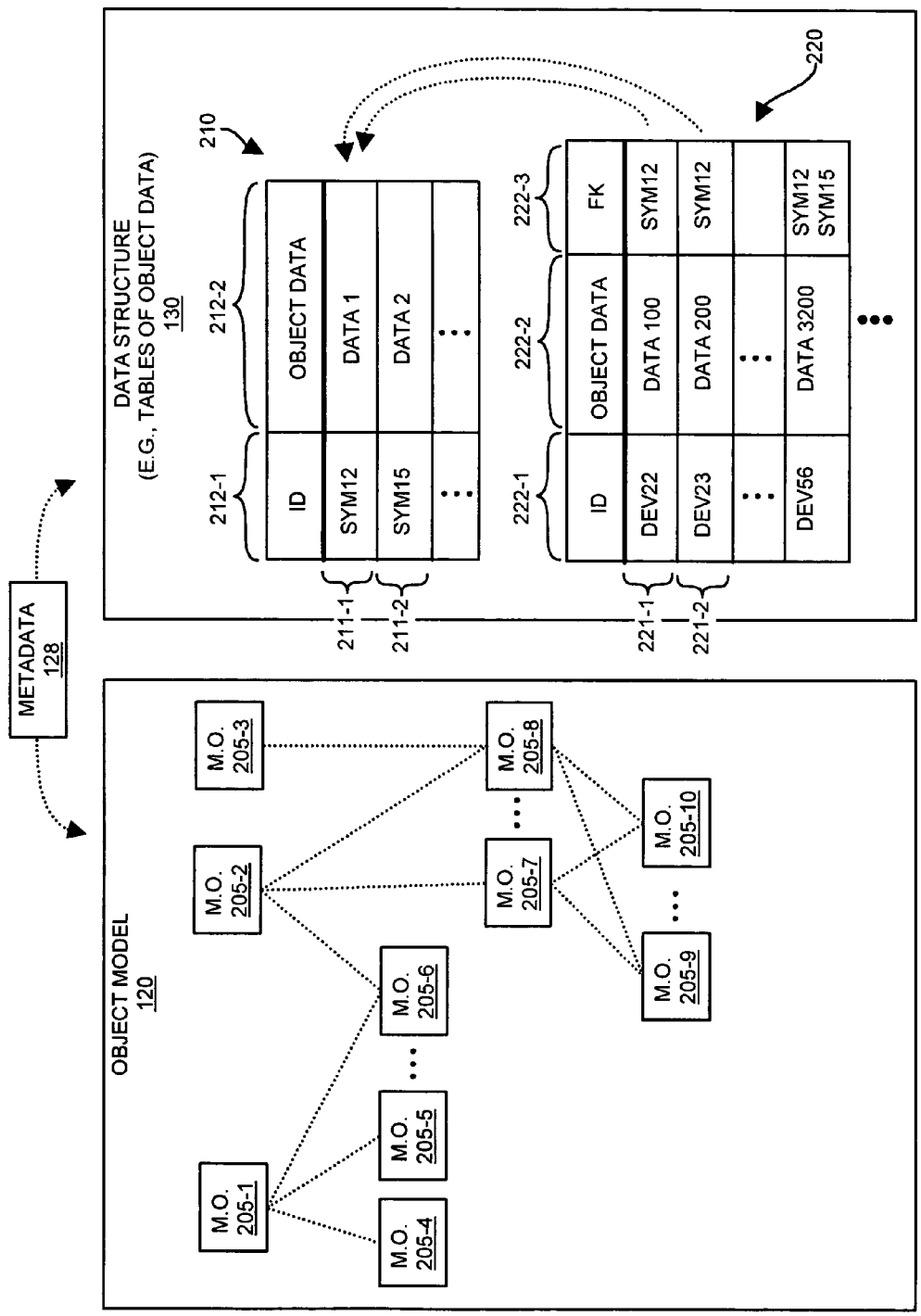
FIG. 2 is a diagram illustrating an object model and corresponding data structure for storing information associated with managed objects according to an embodiment herein.

FIG. 2 is a block diagram more particularly illustrating how data structure 130 of database 180 stores information associated with managed objects 205 in object model 120 (e.g., an object-oriented environment). As shown, object model 120 includes different types of managed object hierarchies for maintaining information associated with resources in a storage area network. Note that an actual instantiation of object hierarchies (e.g., what managed objects exist in an object hierarchy) can vary depending on how a storage area network is actually configured during operation of the storage area network.

An object hierarchy in object model 120 can include different types of relationships characterized based on use of different references (e.g., pointers) with respect to each other. For example, managed objects 205 in object model 120 can be associated with each other via one-to-one relationships, one-to-multiple relationships, and multiple-to-multiple relationships. As will be discussed later in this specification, data structure 130 in database 180 includes similar references for purposes of storing respective object data.

One-to-one relationships correspond to relationships in which a "child" managed object belongs to only one corresponding parent managed object in a respective hierarchy. An example of a one-to-one relationship is managed object 205-7 because managed object 205-7 belongs solely to managed object 205-2 and no other managed objects at a next higher level.

One-to-multiple (e.g., one-to-many) relationships correspond to relationships in which a "child" managed object belongs to multiple corresponding "parent" managed objects. An example of a one-to-multiple relationship is managed object 205-8 because managed object 205-8 belongs to both managed object 205-2 and managed object 205-3.

Multiple-to-multiple (e.g., many-to-many) relationships correspond to relationships in which a group of "child" managed objects belongs to multiple different corresponding "parent" managed objects. An example of a multiple-to-multiple relationship is set of managed objects including managed object 205-9 and managed object 205-10. This set of managed objects belongs to both managed object 205-7 and managed object 205-8.

Note again that data structure 130 stores information associated with managed objects 205 using the same types of relationships as discussed for objects in a hierarchy. One purpose of identifying or learning the different types of relationships associated with managed objects in a respective managed object hierarchy is to be able to properly modify contents of database 180 after initiation of a delete command with respect to an object in a respective hierarchy. For example, certain entries (e.g., object data, pointers, etc.) in data structure 130 must be preserved so that data structure 130 continues to maintain integrity associated with those managed objects not being deleted, while other entries in database 180 must be deleted for the managed object being deleted.

As an example, assume that a user were to initiate deletion of managed object 205-1. In this case, object data as well as references to object data associated with managed object 205-1, managed object 205-4 and managed object 205-5 will be deleted, etc. Additionally, a relationship reference (e.g., one or more pointers) between managed object 205-6 and managed object 205-1 will be deleted. However, object data for managed object 205-6 as well as a relationship reference between managed object 205-2 and managed object 205-6 must be preserved so as to maintain the integrity of managed object 205-2 and corresponding information in database 180 not being deleted. In other words, managed object 205-6 must not be deleted because managed object 205-6 is a "child" associated with managed object 205-2.

When modifying an object having an associated many-to-many type of relationship, procedure generator 140 generates stored procedure 150 such that relational database 180 continues to maintain integrity associated with portions of the content that must continued to be maintained because such contents are associated with other objects not being deleted. In other words, stored procedure 150 when initiated modifies entries in tables of relational database 180 for one-to-many relationships and many-to-many relationships so that relational database 180 no longer maintains references to information for the object being deleted but continues to maintain the information for other objects not being deleted.

As discussed, deletion of a managed object 205 from object model 120 will have an affect on information stored in data structure 130 of database 180 for the corresponding object hierarchy. For example, contents of relational database 180 must be modified upon deletion of a corresponding managed object 205 so that database 180 does not needlessly store information associated with deleted managed objects.

Referring now more specifically to data structure 130, table 210 and table 220 of data structure 130 are examples of how relational database 180 stores information associated with managed objects 205. This example will help illustrate what contents of data structure 130 are impacted as a result of deleting a corresponding object in object model 120. Entry 211-1 (e.g., first row) and entry 211-2 (e.g., second row) of table 210 store object data associated with respective top level managed objects 205-1, 205-2, etc. In this example, unique ID SYM12 of table 210 corresponds to managed object 205-1, unique ID SYM15 of table 210 corresponds to managed object 205-2, etc.

Also, entry 221-1 and entry 221-2 of table 220 correspond to respective managed object 205-4 and managed object 205-5. Unique ID DEV22 of table 220 corresponds to managed object 205-4, unique ID DEV23 of table 220 corresponds to managed object 205-5, unique ID DEV56 of table 220 corresponds to managed object 205-6, etc.

Metadata 128 includes mapping information to indicate that entry 211-1 corresponds to managed object 205-1, entry 211-2 corresponds to managed object 205-2, entry 221-1 corresponds to managed object 205-4, entry 221-2 corresponds to managed object 205-5, entry 221-N corresponds to managed object 205-6, etc.

More specifically, metadata 128 identifies that managed object 205-1 has associated object data in entry 211-1 of table 210, managed object 205-4 has associated object data in entry 212-1 of table 220, managed object 205-5 has associated object data 25, in entry 221-1 of table 220, and so on. Metadata 128 also includes mapping information indicating that unique ID (e.g., SYM12) in column 212-1 of table 210 is associated with managed object 205-1 and that unique ID (e.g., SYM15) in column 212-1 of table 210 is associated with managed object 205-2. In one embodiment, the unique identifiers in column 212-1 of table 210 are known as primary keys.

Metadata 128 also indicates the corresponding unique IDs (e.g., DEV22, DEV23, and DEV56) in column 222-1 associated with respective managed object 205-4, managed object 205-5, managed object 205-6, and so on. Consequently, a table in data structure 130 can store information associated with a respective set of managed objects at a certain level of a managed object hierarchy. In the present example, each entry in table 210 includes information associated with respective "top level" managed objects (e.g., managed objects 205-1, 205-2, and 205-3). Each entry in table 220 includes information associated with managed objects at a tier just below the top level managed objects.

Note that table 220 includes column 222-3 to store reference information or pointers known as foreign keys. A respective foreign key in one table points to an entry in another table. In the present example, the entry 221-1 in table 220 for DEV22 includes a foreign key pointing to SYM12. The entry 221-2 in table 220 for DEV23 includes a foreign key pointing to SYM12. The entry 221-N in table 220 for DEV56 includes a foreign key pointing to SYM12 and SYM15. Thus, based on use of foreign keys, data structure 130 mirrors the relationships between managed objects 205 in object model 120. In one embodiment, metadata 128 includes the foreign keys as well so that procedure generator 140 can identify a hierarchy and corresponding entries of different tables in data structure 130 pertaining to a respective managed object.

Although the above example discusses how tables 210 and 220 store information associated with object hierarchies in object model 120, database 180 can include additional tables, sub-tables, etc. that function in a similar way to support storage of information associated with other portions or subportions of object hierarchies as well. Thus, database 180 includes additional information for other managed objects in object model 120 including managed object 205-7, managed object 205-8, managed object 205-9, and so on.

Referring again to FIG. 1, one purpose of identifying the relationship between managed objects 105 (or managed objects 205 as in FIG. 2) and contents of data structure 130 is to identify what contents in the relational database 180 will be impacted as a result of applying a respective delete command to a specified type of object in the object model 120. Based on the identified relationship, the procedure generator 140 generates a set of operational instructions (e.g., a "stored" procedure) to modify contents of the relational database for a specified object type. The procedure generator 140 stores the set of operational instructions as stored procedure 150 in anticipation of later receiving a corresponding command applied to a specified object in the object-oriented environment.

Accordingly, upon later receipt of a command to modify a specified top level managed object (such as managed object 205-1 in FIG. 2), a server application herein storing the stored procedure 150 can initiate execution of the set of operational instructions associated with the stored procedure 150 to modify contents of the relational database 180. This designtime pre-processing technique such as identifying and analyzing a structure 130 for storing object data in the relational database 180 and generating a set of appropriate operational instructions (e.g., a stored procedure 150) to carry out a later issued command reduces processing time otherwise required to identify relationships between an object and respective object data, pointers, etc. stored in the relational database at run-time.

One application of the technique discussed above is an environment in which a user initiates deletion of one or more managed objects 105 corresponding to a resource in a respective storage area network. Consequently, in this type of application, the user can more effectively execute an object modification command. For example, a user can send a request (to initiate a delete command) to a server associated with the relational database. Upon receipt of the command, the server then initiates execution of the set of operational instructions to carry out the command on behalf of the user. Initiation of the stored procedure 150 during run-time results in execution of database commands such as SQL statements to carry out the requested function with respect to the contents of database 180.

The technique of preparing stored procedure 150 prior to receiving an execution command enables modification to database 180 via fewer SQL statements during run-time than as required conventional applications. For example, pre-analyzing the object model 120 enables procedure generator 140 to produce a set of operational instructions to generate a single SQL statement to modify multiple entries of a respective table in database 180. Thus, when a user initiates execution of a stored procedure 150 associated with managed object 205-1, stored procedure 150 generates an SQL statement to delete entry 211-1 in table 210. Stored procedure 150 also generates an SQL statement to delete multiple entries in table 220, such as entry 221-1 and entry 221-2. Stored procedure 150 can generate an SQL statement to delete all entries of table 220 which have foreign key reference SYM12 in column 222-3. Consequently, if an object being deleted has 30,000 as sub-objects, all of which have object data in the same table in database 180, a single SQL statement can be generated to remove or modify entries in the respective table associated with the 30,000 devices.

Generation Logic for a "Delete" Type of Stored Procedure

The following portion of this disclosure defines an algorithm of a function to generate a stored procedure 150 for top-level managed objects such as DeleteSymmetrix(integer persistentId), DeleteClarion(integer persistentId), DeleteHost(integer persistentId), etc. associated with a storage area network application. As mentioned, the procedure generator 140 generates stored procedures 150 during a design phase.

First, a source passes the class name of a top level managed object to the procedure generator 140 (e.g., generation function). The procedure generator 140 accesses metadata 128 to identify object/table mappings (e.g., via foreign keys as well as other information) between the object model 120 and database 180 for the object type. This procedure generator 140 iterates through all mapping type attributes (e.g., object/relational database relationship attributes). The procedure generator 140 examines the mapping types. For each attribute having a relationship type mapping (e.g., a foreign key), the procedure generator 140 utilizes recursive techniques to traverse a relationship mapping down to a lowest level object of data in the relational database 180 to create code for deleting contents of a respective hierarchy from leaf back to the root object being deleted. Thus, the procedure generator 140 relies on the metadata 128 to traverse all objects (from leaf to root) associated with a top-level managed object in a respective hierarchy to generate appropriate delete and/or update SQL statements to modify contents of database 180. In one embodiment, the generated SQL statements need to be issued in an appropriate order to avoid any database error due to referential integrity violations.

GenerateProcedure (String Class-Name)

For a given top-level class-name for which the database stored needs to be generated:
  Generate code for database stored procedure header.
  Call function TraverseObjectGraph (top-level_class-name).
  Generate footer for database stored procedure.
  Function TraverseObjectGraph uses metadata 128 to find details about object model 120 and corresponding database tables 130.

Function TraverseObjectGraph (String Class-Name)

For a given class-name traverse up and down an inheritance hierarchy and build a list of all objects in the hierarchy in correct order from leaf to root.

For each object in the inheritance hierarchy, loop through a respective object starting from leaf and processing towards the root. In one embodiment, procedure generator 140 utilizes metadata 128 to identify contents of database 180 associated with the inheritance hierarchy.

For each <object> from inheritance-hierarchy
  For each <relationalAttribute> from <object>
    For one-to-one and one-to-many type of relationships:
      If relationship is marked "privately owned", identify lower level relationships to be deleted by recursive call to the function TraverseObjectGraph (reference_class_name).
      Else if (relationship is not marked privately owned) referencedClass holds the foreign key column, then set the foreign key column in a respective table of database 180 to null. This only removes reference of object to be deleted from database table mapped to the referenced class rather than the data associated to the referenced object. Collect the change event for the removed relationship. Use metadata 128 to get the database table mapped to the referencedClass.
      UPDATE    <Table    WithFKColumn>    SET <FKColumn>=NULL
      WHERE <FKColumn> IN <SubQuery>
      RETURNING <PK_ID>, <OBJ_TYPE>, 'UPDATE' BULK
      COLLECT INTO change-setCollection;
        <Sub Query>. Query to select primary key column of ObjectToBeDeleted by joining the table to its container table. This links all identifiers to the top-level object being deleted.
  For many-many relationship, find a relationship table name based on the metadata 128 and generate delete entry statements (e.g., SQL statements) for one or more rows of the many-many relationship table.
  DELETE FROM <relationship_tableName>
  WHERE <FK_COL > IN <SubQuery>
  RETURNING <PK_ID>, <OBJ_TYPE>, 'DELETE' BULK COLLECT
  INTO change-setCollection;
    <FK_COL> is the foreign key column in relationship table which references the primary key column in ObjectToBeDeleted
    If relationship is marked "privately owned" then for referencedObject recursively call TraverseObjectGraph (reference_class_name) to traverse corresponding sub-relationships.
  For Direct Collection mapping (a variation of a one-to-many relationship), find collection table name and generate delete statement for collection table.
  DELETE FROM <collection_tableName>
  WHERE <PK_ID> IN <SubQuery>
  RETURNING <PK_ID>, <OBJ_TYPE>, 'DELETE' BULK COLLECT
  INTO change-setCollection;
    <PK_ID> is the primary key of collection table. This column also includes a foreign key referencing the primary key column of ObjectToBeDeleted.
  Uni-directional association of the ObjectToBeDeleted: Traverse all objects in the model and find if any of them has uni-directional association to the object to be deleted. If database table mapped to the referencedClass contains the foreign key column then generate update statement to remove the reference of object to be deleted:
  UPDATE    <Table    WithFKColumn>    SET <FKColumn>=NULL
  WHERE <FKColumn> IN <SubQuery>
  RETURNING <PK_ID>, <OBJ_TYPE>, 'UPDATE' BULK COLLECT
  INTO change-setCollection;

Using metadata 128, find database table mapped to ObjectToBeDeleted and generate SQL statement to delete the object (at this point all dependent objects are traversed and corresponding delete or update SQL statements are generated):
  DELETE FROM <tableName> WHERE <PK_ID> IN <SubQuery>
  RETURNING <PK_ID>, <OBJ_TYPE>, 'DELETE' BULK COLLECT
  INTO change-setCollection;

Identifier of all data objects that will be changed as a result of executing above generated SQL statements will be logged into database 180 by following SQL code:

```
FOR x IN change-setCollection.FIRST..
        change-setCollection.LAST LOOP
    INSERT INTO ChangeSet ( tranactionId,
                            objectId,
                            objectType,
                            action )
    VALUES (    <tranactionId>,
                change-setCollection (x).objectId,
                change-setCollection (x).objectType,
                change-setCollection (x).action );
    END attribute-loop
END object-loop
```

Figure 3:
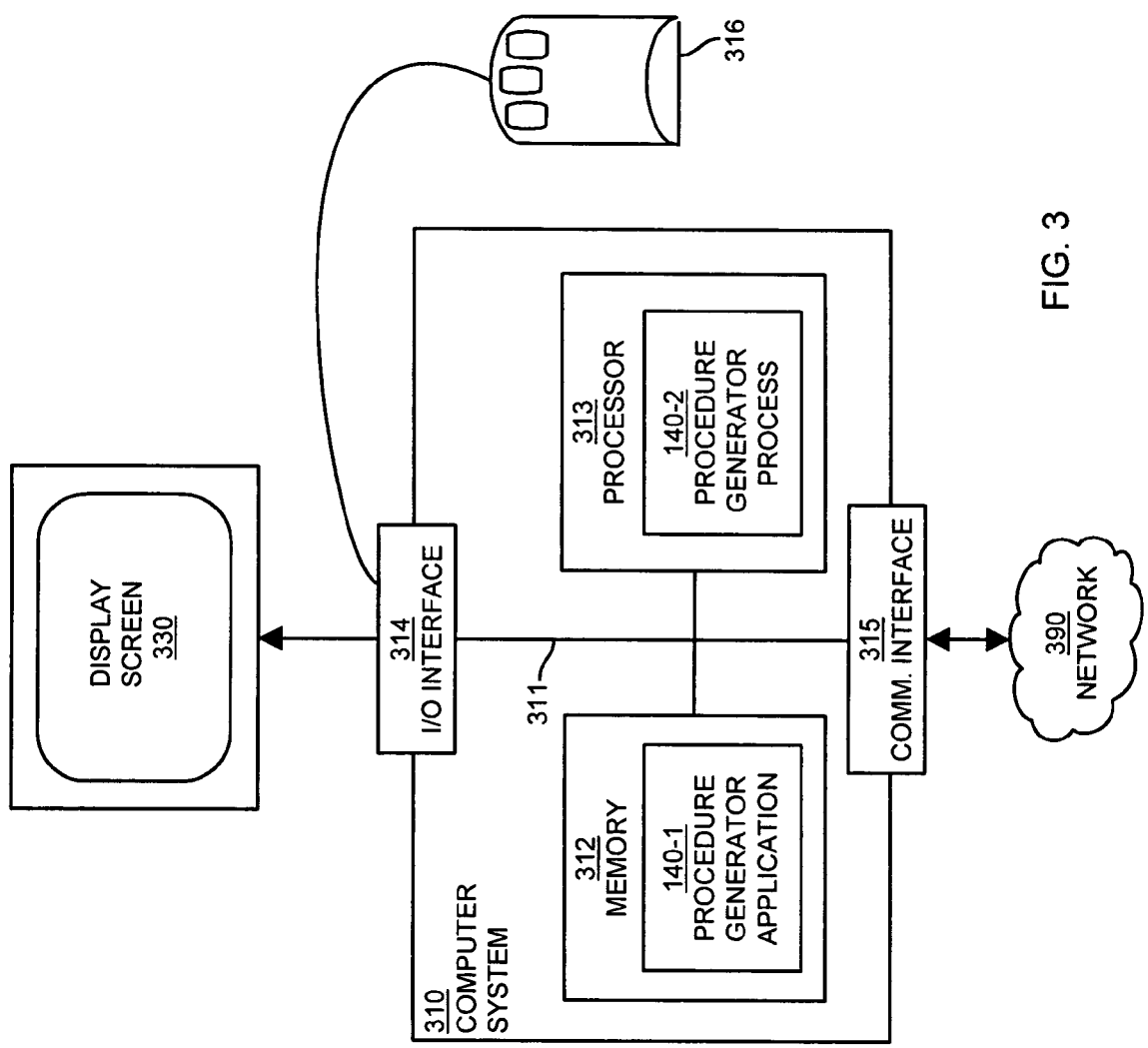
FIG. 3 is a block diagram of a processing device suitable for generating a set of operational instructions for executing a respective command associated with a managed object according to an embodiment herein.

FIG. 3 is a block diagram illustrating an example computer system 310 for executing procedure generator application 140 according to embodiments herein. Computer system 310 may be a computerized device such as a personal computer, workstation, portable computing device, console, network terminal, processing device, etc.

As shown, computer system 310 of the present example includes an interconnect 311 that couples a memory system 312, a processor 313, I/O interface 314, and a communications interface 315. Peripheral devices 316 (e.g., one or more optional user controlled devices such as a keyboard, mouse, display screens, etc.) couple to processor 313 through I/O interface 314. Communications interface 315 of computer system 310 enables computer system 310 to communicate over network 390 to transmit and receive information from different resources.

As shown, memory system 312 is encoded with procedure generator application 140-1 supporting generation of one or more stored procedures 150 associated with a storage area network environment. Procedure generator application 140-1 may be embodied as software code such as data and/or logic instructions (e.g., code stored in the memory or on another computer readable medium such as a disk) that support processing functionality according to different embodiments described herein. During operation, processor 313 accesses memory system 312 via the interconnect 311 in order to launch, run, execute, interpret or otherwise perform the logic instructions of the procedure generator application 140-1. Execution of procedure generator application 140-1 produces processing functionality in procedure generator process 140-2. In other words, the procedure generator process 140-2 represents one or more portions of the procedure generator application 140-1 (or the entire application) performing within or upon the processor 313 in the computer system 310.

It should be noted that procedure generator 140 (in FIG. 1) executed in computer system 310 can be represented by either one or both of the agent application 140-1 and/or the agent process 140-2. For purposes of this discussion and different embodiments of the invention, general reference will again be made to the procedure generator 140 as performing or supporting the various steps and functional operations as previously discussed and as will be discussed further in this specification.

It should be noted that, in addition to the procedure generator process 140-2, embodiments herein include the procedure generator application 140-1 itself (i.e., the un-executed or non-performing logic instructions and/or data). The procedure generator application 140-1 may be stored on a computer readable medium such as a floppy disk, hard disk or in an optical medium. The procedure generator application 140-1 may also be stored in a memory type system such as in firmware, read only memory (ROM), or, as in this example, as executable code within the memory system 312 (e.g., within Random Access Memory or RAM). In addition to these embodiments, it should also be noted that other embodiments herein include the execution of procedure generator application 140-1 in processor 313 as the procedure generator process 140-2. Thus, those skilled in the art will understand that the computer system 310 may include other processes and/or software and hardware components, such as an operating system that controls allocation and use of hardware resources.

Functionality supported by computer system 310 and, more particularly, procedure generator 140 will now be discussed via flowcharts in FIGS. 4-6. For purposes of this discussion, computer system 310 generally performs steps in the flowcharts. This functionality can be extended to the other entities as well. Note that there will be some overlap with respect to concepts discussed above for FIGS. 1 and 2. Also, note that the steps in the below flowcharts need not always be executed in the order shown.

Figure 4:
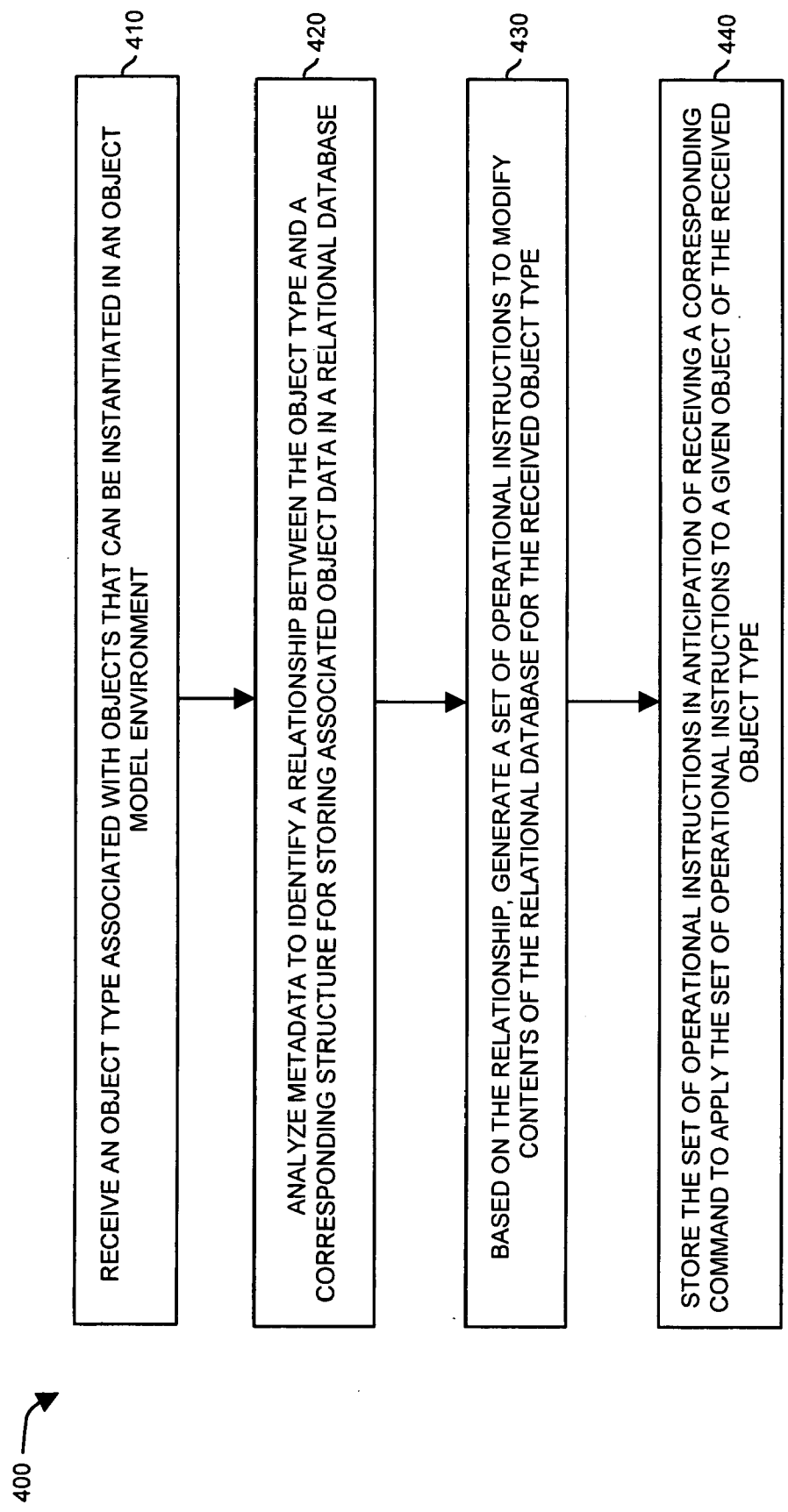
FIG. 4 is a flowchart illustrating a technique facilitating management of object data according to an embodiment herein.

Now, more particularly, FIG. 4 is a flowchart 400 illustrating a technique of generating a stored procedure 150 for efficiently modifying an object hierarchy and/or a database 180 as discussed above.

In step 410, procedure generator 140 receives an object type associated with objects in object model environment such as object model 120 of FIGS. 1 and 2.

In step 420, procedure generator 140 analyzes metadata 128 to identify a relationship between the object type and a corresponding structure 130 for storing associated object data in a relational database 180.

In step 430, based on the identified relationship, procedure generator 140 generates stored procedure 150 (e.g., a set of operational instructions) to later modify contents of the relational database 180.

In step 440, procedure generator 140 stores the stored procedure 150 in anticipation of receiving a corresponding command to apply the stored procedure 150 to a given object (of the received object type as in step 410) in the object model 120.

Figure 5:
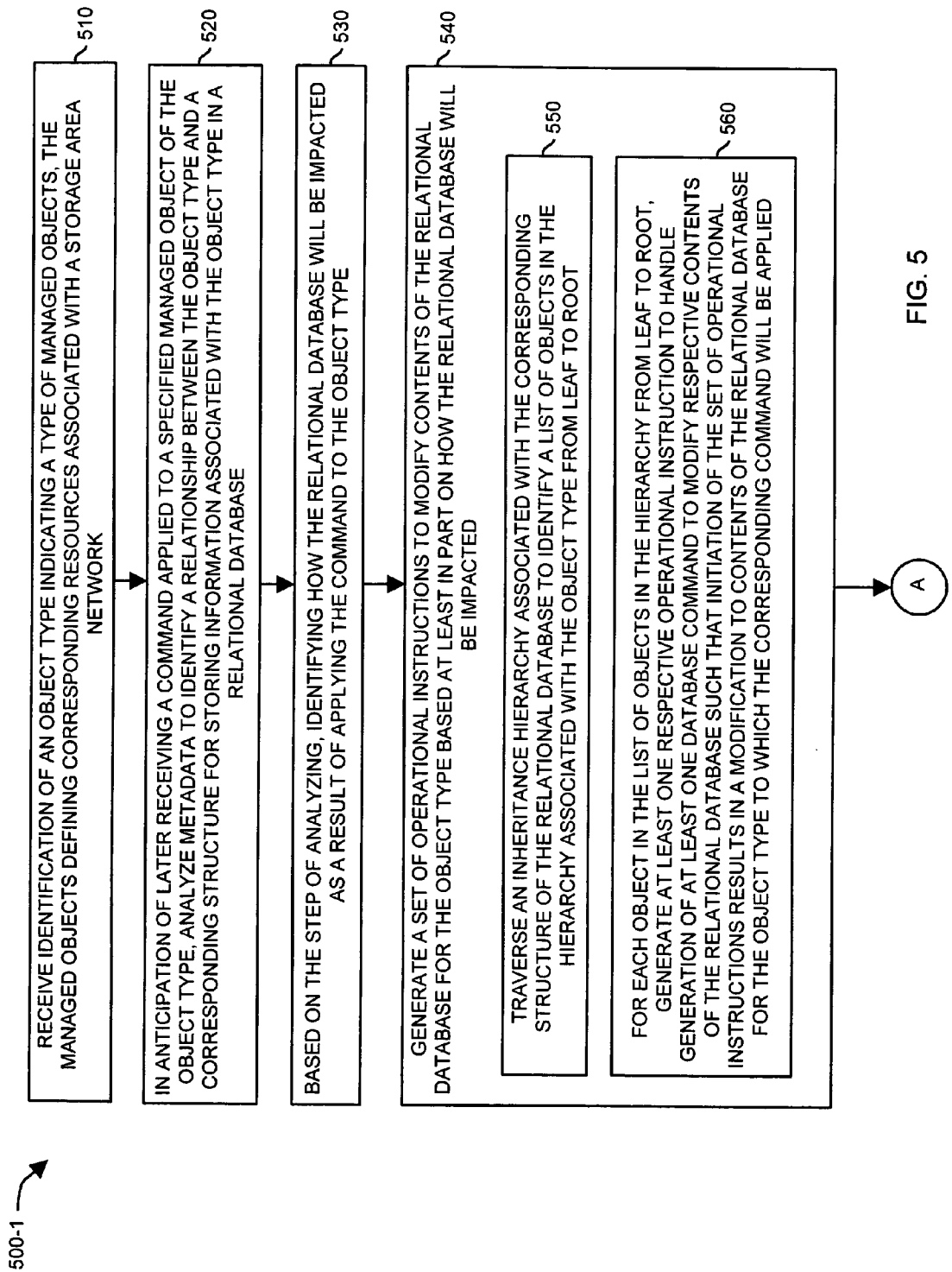
FIGS. 5 and 6 combine to form a more detailed flowchart illustrating a technique facilitating management of object data according to an embodiment herein.
Figure 6:
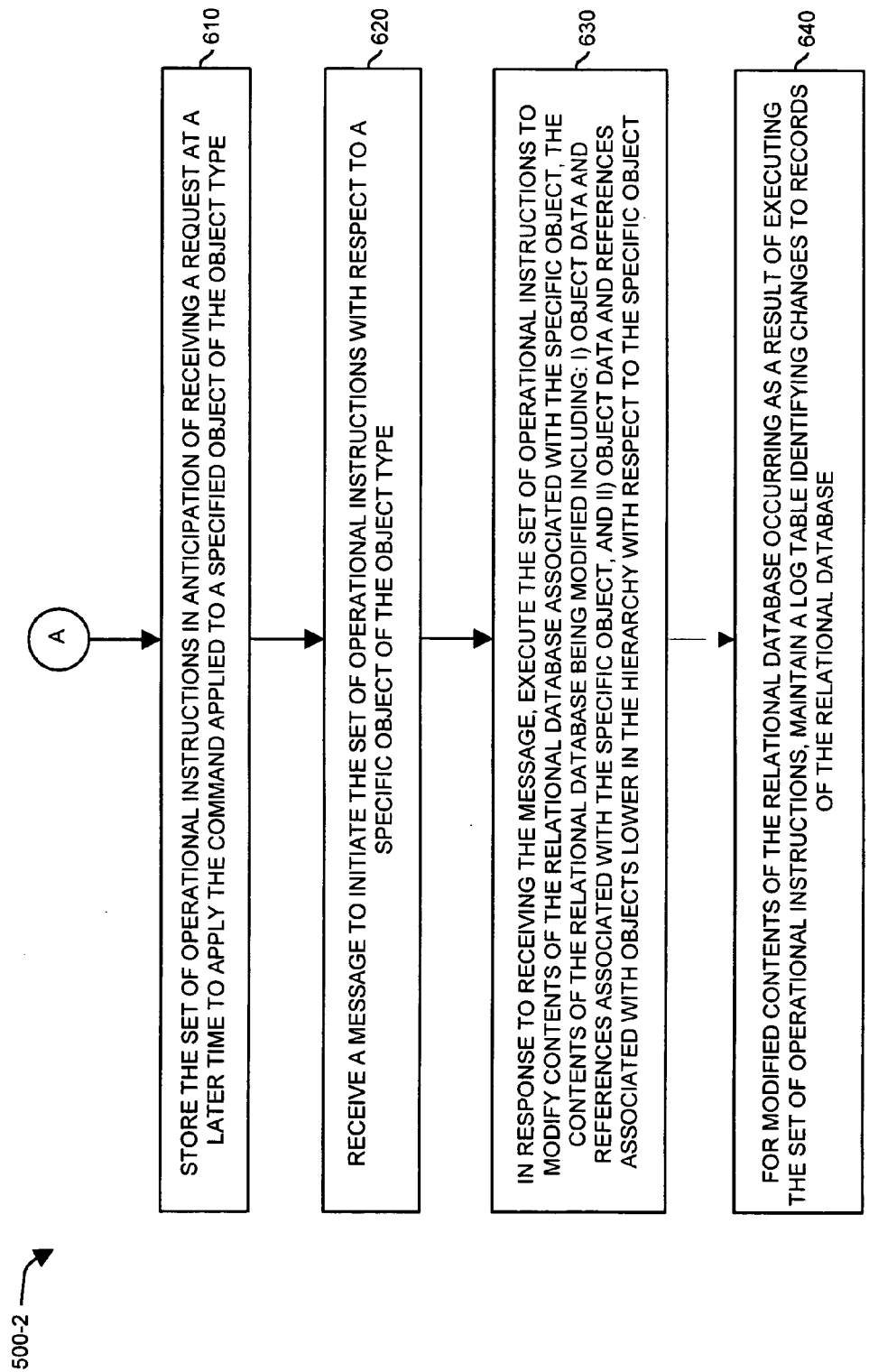

FIGS. 5 and 6 combine to form a flowchart 500 (including flowchart 500-1 and flowchart 500-2) illustrating a technique of generating and utilizing a stored procedure 150. Certain portions of the flowchart 500 such as generating the stored procedure 150 can be executed via computer system 310 during a design phase while other portions such as executing a stored procedure 150 can be executed at runtime via a server associated with database 180. More specifically, steps 510 through 560 as well as steps 610 and 620 are performed by computer system 310 during a design phase while steps 620, 630 and 640 are performed by an entity such as a server executing a respective stored procedure 150. In one embodiment, the generation of stored procedures 150 is done at the design time and the stored procedures are deployed with the product (i.e. within the instance of the DB server shipped to the customer), while the execution of the specific stored procedure for the specific object is triggered at run time by the application/user. This technique of generating the stored procedure prior to run-time reduces an overall amount of time and number of database instructions that need to be issued for implementing a respective command with respect to objects associated with a storage area network.

In step 510 of flowchart 500-1 during a design phase, procedure generator 140 receives identification of an object type. The object type indicates a type of one or more managed objects. The one or more managed objects define corresponding resources associated with a storage area network.

In step 520, in anticipation of later receiving a command applied to a specified managed object of the object type received in step 510, procedure generator 140 analyzes metadata 128 to identify a relationship between the object type (e.g., a type of object) and a corresponding structure 130 for storing information associated with the object type in a relational database 180.

In step 530, based on the analyzing in step 520, procedure generator 140 identifies how the relational database 180 will be impacted as a result of applying the command to an object of the object type identified in step 510.

In step 540, procedure generator 140 generates stored procedure 150 (e.g., a set of operational instructions). Stored procedure 150 can be used to later modify contents of the relational database 180 for the object type based at least in part on how the relational database 180 will be impacted.

In sub-step 550 associated with step 540, to generate the stored procedure 150, procedure generator 140 traverses a graph or hierarchies of objects associated with the corresponding structure 130 of the relational database 180 to identify a list of objects in the object hierarchy associated with the object type from leaf to root.

In sub-step 560 associated with step 540, for each object in the list of objects in the hierarchy from leaf to root associated with the object type, procedure generator 140 generates at least one respective operational instruction to handle generation of at least one database command to modify respective contents of the relational database such that initiation of the set of operational instructions results in a modification to contents of the relational database for the object type to which the corresponding command will be applied. In one embodiment, initiation of the command also causes modification to the object and/or object hierarchy to which the command is applied.

Continuing with flowchart 500-2 in FIG. 6, in step 610, procedure generator 140 stores the set of operational instructions (e.g., stored procedure 150) in anticipation of receiving a request at a later time to apply the command to a specified object of the object type identified in step 510.

In step 620, during run-time, a server associated with relational database 180 receives a message to initiate the stored procedure 150 with respect to a specific object having corresponding data stored n database 180.

In step 630, in response to receiving the message, the server associated with relational database 180 executes the stored procedure 150 to modify contents of the relational database 180 associated with the specific object. Execution of the stored procedure 150 causes contents of the relational database to be modified. In one embodiment, execution of the stored procedure 150 results in modification to: i) object data and references associated with the specific object, and ii) object data and references associated with objects lower in the hierarchy with respect to the specific object. In other words, execution of the stored procedure 150 results in modification to the above-mentioned contents of the relational database 180.

In one embodiment, execution of stored procedure 150 results in execution of SQL statements to modify database 180. Based on determining what contents of database 180 will be impacted as a result of executing a respective delete command with respect to an object, stored procedure 150 can generate a single SQL statement to modify many entries in a corresponding table of database 180. As an example, if a user deletes a top level object representing a storage system of a storage area network, the stored procedure 150 issues an SQL statement to delete contents (e.g., an entry in table 210 of FIG. 2) of database 180 associated with the deleted object information at a lower level of the object hierarchy such as entries 221-1 and 221-2 of table 220. A single SQL statement executed by the stored procedure 150 can modify multiple entries in a respective table of database 180, thereby reducing an amount of time required to modify contents of the relational database 180 in response to deletion of an object.

In step 640, for modified contents of the relational database 180 occurring as a result of executing the stored procedure 150, a logger generated by the procedure generator 140 as part of the stored procedure 150 maintains a log table identifying respective changes to the relational database 180. Thus, a user can initiate execution of a command and thereafter view what changes have occurred in the relational database 180.

Figure 7:
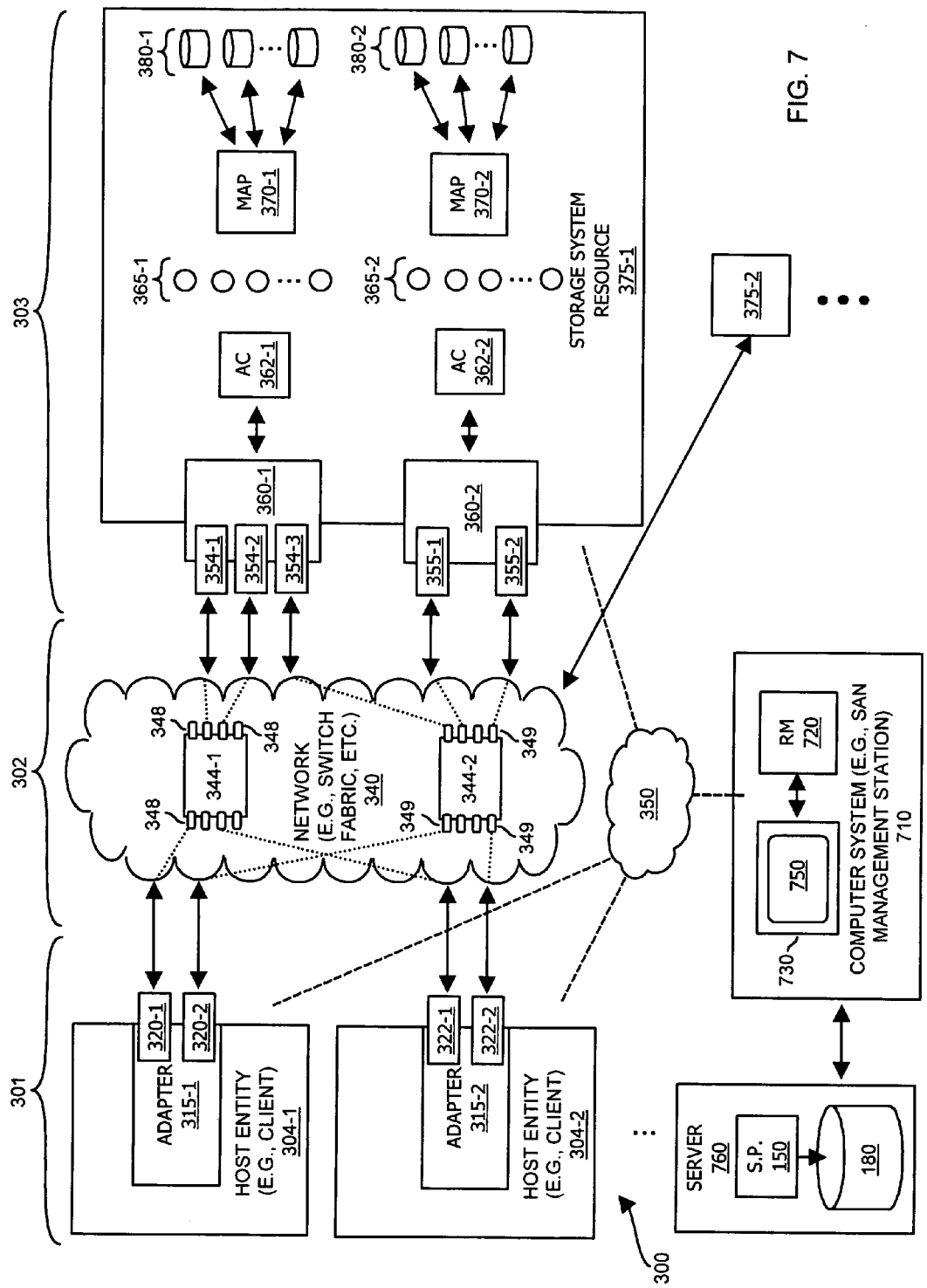
FIG. 7 is a block diagram illustrating resources in a storage area network environment represented by managed objects according to an embodiment herein.

FIG. 7 is a block diagram more particularly illustrating connectivity of example network resources (e.g., host resources 301, switch resources 302, and storage resources 303) in a storage area network environment 300. As shown, storage area network environment 300 includes host entity 304-1, host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and database 180. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

Resource manager 720 in computer system 710 provides management functions with respect to storage area network environment 300. Database 180 stores managed objects including information reflecting a configuration of storage area network environment 300.

A user can retrieve the managed objects from database 180 for viewing on display screen 730 (e.g., via a graphical user interface 750) to view a respective configuration of the storage area network 300. In addition to the examples of object hierarchies discussed herein, examples of other samples managed object hierarchies associated with the storage area network can be found in related U.S. patent application Ser. No. 11/001,489 entitled "METHODS AND APPARATUS FOR DEALLOCATION OF RESOURCES," filed on Dec. 1, 2004, the entire teachings of which are incorporated herein by this reference.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340. Resource manager 720 enables a user to modify a configuration of the storage area network. For example, resource manager 720 enables a user such as a network administrator to initiate application of stored procedure 150 to modify contents of database 180 and modify a respective configuration. In one embodiment, a network administrator modifying the configuration of storage area network sends a message to server 760 to initiate a particular command with respect to a top-level object representing a respective storage system in the storage area network. In response to receiving the message, server 760 generates database commands (e.g., SQL statements) based on applying stored procedure 150 as discussed.

As discussed above, techniques herein are well suited for use in environments enabling initiation of commands on objects and/or object hierarchies having respective object data stored in a relational database. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A computer-implemented method in which at least one computer system initiates execution of instructions retrieved from storage to facilitate management of objects in an object-oriented environment, the computer-implemented method comprising:
receiving an object type associated with the objects;
analyzing metadata to identify a relationship between the object type and a corresponding structure for storing associated object data in a relational database;
based on the relationship, generating a set of operational instructions to modify contents of the relational database for the received object type; and
storing the set of operational instructions in anticipation of receiving a corresponding command to apply the set of operational instructions to a given object of the received object type.

2. A computer-implemented method as in claim 1, wherein analyzing the metadata to identify the relationship includes analyzing a set of tables in the relational database to determine the corresponding structure of the relational database for storing data associated with any of multiple objects of the received object type, the set of tables including: i) a first table including a reference to a second table in the set of tables, and ii) associated object data that would be impacted as a result of applying the set of operational instructions to any of multiple objects in the corresponding structure of the received object type.

3. A computer-implemented method as in claim 2 further comprising:

receiving a message to initiate execution of the set of operational instructions with respect to a specific object in the object-oriented environment, the specific object being one of multiple objects in the object-oriented environment of a same type as the received object type to which the command can be applied; and
in response to receiving the message, initiating execution of the set of operational instructions to modify entries in the set of tables associated with the specific object, the entries including the associated object data as well as references to other tables associated with the specific object being deleted from the object-oriented environment.

4. The computer-implemented method as in claim 2 further comprising:
subsequent to storing the operational instructions for the received object type:
receiving a request to apply the set of operational instructions to the given object, the given object being of a same object type as the received object type, the given object being one of the multiple objects, wherein the set of operational instructions can be applied to each of the multiple objects, each of the multiple objects of the received object type having a same associated structure for storing data in the relational database; and
in response to receiving the request, initiating execution of the set of operational instructions to modify object data associated with the given object in the relational database.

5. A computer-implemented method as in claim 1, wherein each of the objects are of the received object type and wherein the given object is a selected object of the objects; and
wherein receiving the object type includes receiving identification of a parent type object in a storage area network environment, the parent type object being a type of storage area network resource defined by a respective object above at least one child object in a hierarchy of objects in the storage area network environment, the method further comprising:
receiving a message initiating application of the set of operational instructions to modify contents of the relational database such that the relational database no longer maintains respective object data associated with a parent managed object of the storage area network environment, the parent managed object being one of multiple managed objects to which the set of operational instructions can be applied.

6. The computer-implemented method as in claim 5, wherein the given object is one of multiple different objects, each of the multiple different objects being of the received object type to which the corresponding command and set of operational instructions can be applied; and
wherein the set of operational instructions are selectively applied to the multiple different objects of the received object type based on receipt of requests to apply the corresponding command to the multiple different objects.

7. A computer-implemented method as in claim 1, wherein generating the set of operational instructions further includes:
prior to receiving the corresponding command:
based at least in part on the metadata for the received object type, traversing a hierarchy associated with the corresponding structure of the relational database to identify a list of objects in the hierarchy from leaf to root; and
for each object in the list of objects in the hierarchy from leaf to root, generating a respective operational instruction to handle generation of at least one database command to modify respective contents of the relational database such that executing the set of operational instructions with respect to a specific object, which is one of multiple objects of the received object type to which the corresponding command can be applied, results in a modification to contents of the relational database for the specific object to which the corresponding command is applied.

8. A computer-implemented method as in claim 7, wherein generation of the at least one database command involves generation of a single SQL (Structured Query Language) statement to modify multiple entries of a corresponding table in the relational database, the corresponding table representing a relationship mapping towards a root of the hierarchy.

9. A computer-implemented method as in claim 1, wherein the set of operational instructions, when executed, in turn generate statements for modifying the contents of the relational database, the computer-implemented method further comprising:
   initiating execution of the set of operational instructions to modify contents of the relational database in response to receiving a command to delete the given object, the given object being one of multiple objects in the object-oriented environment to which the set of operational instructions can be applied, the contents including values of pointers stored in tables of the relational database, at least one of the pointers referencing an entry to another table in the relational database.

10. The computer-implemented method as in claim 1, wherein analyzing the metadata to identify the relationship between the object type and the corresponding structure includes:
   in anticipation of receiving the corresponding command to modify the given object of the received object type in the future, identifying at least one location in a respective table of the relational database where the associated object data is stored in the relational database for the received object type.

11. The computer-implemented method as in claim 1, wherein generating the set of operational instructions includes:
   generating at least one instruction in the set of operational instructions that, when executed at a later time in response to subsequently receiving the corresponding command, modifies object data in the relational database associated with at least one object residing lower in a respective hierarchy than a position of the given object in the respective hierarchy.

12. The computer-implemented method as in claim 1, wherein generating the operational instructions includes pre-mapping of the associated object data to tables of the relational database in anticipation of receiving the corresponding command at a later time subsequent to the pre-mapping, the tables including the associated object data for the received object type, the given object being one of multiple objects in the object-oriented environment to which the set of operational instructions can be applied.

13. The computer-implemented method as in claim 1 further comprising:
   prior to run-time when the corresponding command is applied to a specific one of multiple objects of the received object type, analyzing the corresponding structure for storing object data in the relational database to identify relationships between the received object type and respective object data stored in the relational database, the corresponding structure including a hierarchy of objects including multiple objects of the received object type.

14. The computer-implemented method as in claim 1, wherein generating the set of operational instructions to modify contents of the relational database for the received object type comprises:
   generating the set of operational instructions for selective application to any of multiple objects that are of a same object type as the received object type, the selective application including execution of the set of operational instructions by a computer system, the execution of the operational instructions resulting in generation of statements to modify contents of the relational database for a selected one of the objects of the received object type.

15. A computer-implemented method as in claim 1, wherein analyzing the metadata includes analyzing a hierarchical tree of objects having corresponding data stored in the relational database, the analyzing including identifying a relationship between the object type and other related objects in the hierarchical tree of objects; and
   wherein generating the set of operational instructions includes generating the set of operational instructions for subsequent application to objects in the hierarchical tree that are of a same type as the received object type.

16. A computer-implemented method as in claim 1 further comprising:
   subsequent to generating and storing the set of operational instructions for the corresponding command:
      receiving a request to apply the corresponding command to the given object, the given object being one of multiple objects in the object-oriented environment to which the set of operational instructions can be applied; and
      in response to identifying that a type associated with the given object is equivalent to the received object type, initiating execution of the set of operational instructions to execute the corresponding command on the given object.

17. A computer-implemented method as in claim 16, wherein execution of the set of operational instructions results in deletion of a set of object data stored in the relational database, the set of object data including data associated with the given object and object data associated with objects in the corresponding structure beneath the given object.

18. The computer-implemented method of claim 1, wherein the given object is one of multiple objects; and
   wherein the corresponding command and set of operational instructions can be applied to each of the multiple objects to modify contents of the relational database.

19. The computer-implemented method as in claim 1, wherein the received object type is a type of parent object in a hierarchy of the object-oriented environment, the hierarchy potentially including multiple child objects beneath the parent object;
   wherein generating the set of operational instructions includes generating the set of operational instructions to delete the parent object and a first child object beneath the parent object, the first child object having the parent object as a single parent residing above the first child object in the hierarchy; and
   wherein generating the set of operational instructions includes generating the set of operational instructions to prevent deletion of a second child object beneath the parent object, the second child object having multiple parent objects, the multiple parent objects including the parent object being deleted and at least one other additional parent object that is not being deleted.

20. The computer-implemented method as in claim 19 further comprising:

utilizing the foreign keys of the relational database to identify the corresponding structure associated with the parent object and objects residing beneath the parent object, the corresponding structure indicating which child objects beneath the parent object will be deleted when executing the set of operational instructions.

21. A computer system that facilitates management of objects in an object-oriented environment, the computer system comprising:

a processor;

a memory unit that stores instructions associated with an application executed by the processor; and an interconnect coupling the processor and the memory unit, enabling the computer system to execute the application and perform operations of:

receiving an object type associated with the objects;

analyzing metadata to identify a relationship between the object type and a corresponding structure for storing associated object data in a relational database;

based on the relationship, generating a set of operational instructions to modify contents of the relational database for the received object type; and storing the set of operational instructions in anticipation of receiving a corresponding command to apply the set of operational instructions to a given object of the received object type.

22. A computer system as in claim 21, wherein receiving the identified type of object having the associated object data stored in the relational database includes receiving identification of a type of parent level managed object associated with a storage area network environment, the type of parent level managed object being a type of storage area network resource defined by a respective object at a parent level of a hierarchy of objects in the storage area network environment, the computer system further supporting:

receiving a message initiating application of the set of operational instructions to modify contents of the relational database such that the relational database no longer maintains respective object data associated with a deleted parent level managed object of the storage area network environment.

23. A computer system as in claim 21, wherein generating the set of operational instructions further includes:

based at least in part on the metadata for the received object type, traversing a hierarchy associated with the corresponding structure of the relational database to identify a list of objects in the hierarchy from leaf to root; and for each object in the list of objects in the hierarchy from leaf to root, generating a respective operational instruction to handle generation of at least one database command to modify respective contents of the relational database such that initiation of the set of operational instructions results in a modification to contents of the relational database for a object of the received object type to which the corresponding command is applied.

24. A computer program product including a computer-readable storage medium having instructions stored thereon for processing data information, such that the instructions, when carried out by a processing device, enable the processing device to perform the steps of:

receiving identification of an object type indicating a type of managed objects, the managed objects defining corresponding resources associated with a storage area network;

in anticipation of later receiving a command applied to a specified managed object of the object type, analyzing metadata to identify a relationship between the object type and a corresponding structure for storing information associated with the object type in a relational database;

based on the analyzing, identifying how the relational database will be impacted as a result of applying the command to the object type;

generating a set of operational instructions to modify contents of the relational database for the object type based at least in part on how the relational database will be impacted;

storing the set of operational instructions in anticipation of receiving a future request to apply the command applied to a specified object of the object type.

\* \* \* \* \*